United States Patent
Ladha et al.

(10) Patent No.: US 9,979,613 B2
(45) Date of Patent: May 22, 2018

(54) ANALYZING NETWORK TRAFFIC IN A COMPUTER NETWORK

(71) Applicant: Hewlett Packard Enterprise Development LP, Houston, TX (US)

(72) Inventors: Deepak Ladha, Bangalore (IN); Swapnesh Banerjee, Bangalore (IN); Akash Deep, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days. days.

(21) Appl. No.: 15/114,068

(22) PCT Filed: Jan. 30, 2014

(86) PCT No.: PCT/IN2014/000077
§ 371 (c)(1),
(2) Date: Jul. 25, 2016

(87) PCT Pub. No.: WO2015/114646
PCT Pub. Date: Aug. 6, 2015

(65) Prior Publication Data
US 2016/0366034 A1    Dec. 15, 2016

(51) Int. Cl.
*H04L 12/26*    (2006.01)

(52) U.S. Cl.
CPC .......... *H04L 43/022* (2013.01); *H04L 43/026* (2013.01); *H04L 43/028* (2013.01); *H04L 43/04* (2013.01); *H04L 43/045* (2013.01)

(58) Field of Classification Search
None
See application file for complete search history.

(56) References Cited

U.S. PATENT DOCUMENTS 6,546,420 B1    4/2003  Lemler et al.
6,965,574 B1 *  11/2005 Cook .................... H04L 43/026
                                                    370/252

(Continued)

FOREIGN PATENT DOCUMENTS

CA    2416629 A1    7/2004
CN    1937574 A     3/2007

(Continued)

OTHER PUBLICATIONS

Duffield, N. et al., "Estimating Flow Distributions From Sampled Flow Statistics," (Research Paper), Proceedings of the 2003 Conference on Applications, Technologies, Architectures and Protocols for Computer Communications, Aug. 25-29, 2003, 12 pages, available at http://citeseerx.ist.psu.edu/viewdoc/download?doi=10.1.1.90.8056&rep=rep1&type=pdf.

(Continued)

*Primary Examiner* — Hong Cho
(74) *Attorney, Agent, or Firm* — Hewlett Packard Enterprise Patent Department

(57) ABSTRACT

Provided is a method of analyzing network traffic in a computer network. An Internet Protocol (IP) flow record of an IP flow in a computer network is selected. The selected IP flow record and additional IP flow records corresponding to the IP flow of the selected IP flow record are analyzed to obtain information related to the network traffic in the computer network.

20 Claims, 5 Drawing Sheets

(56) References Cited

U.S. PATENT DOCUMENTS

| | | | | |
|---|---|---|---|---|
| 7,142,651 | B2* | 11/2006 | Ronen | H04L 63/0272 379/114.14 |
| 7,466,703 | B1* | 12/2008 | Arunachalam | H04L 45/00 370/351 |
| 7,782,793 | B2 | 8/2010 | Olesinski et al. | |
| 7,990,982 | B2 | 8/2011 | Duffield et al. | |
| 8,601,113 | B2* | 12/2013 | Dolisy | G06F 17/30489 709/202 |
| 2002/0165956 | A1* | 11/2002 | Phaal | G06F 17/3089 709/224 |
| 2009/0016236 | A1 | 1/2009 | Alcala et al. | |
| 2010/0265835 | A1 | 10/2010 | Haley et al. | |
| 2013/0159864 | A1* | 6/2013 | Smith | H04L 41/12 715/734 |
| 2015/0120856 | A1* | 4/2015 | Bennett | H04L 47/10 709/213 |

FOREIGN PATENT DOCUMENTS

| | | |
|---|---|---|
| CN | 101051952 A | 10/2007 |
| CN | 101714929 A | 5/2012 |
| WO | WO-2006130830 A2 | 12/2006 |

OTHER PUBLICATIONS

International Search Report & Written Opinion received in PCT Application No. PCT/IN2014/000077, dated Sep. 3, 2014, 14 pages.
Sekar, V. et al., "cSamp: a System for Network-wide Flow Monitoring," (Research Paper), NSDI, vol. 8, Apr. 9, 2008, 22 pages, available at https://www.usenix.org/legacy/event/nsdi08/tech/full_papers/sekar/sekar_html/.

\* cited by examiner

ANALYZING NETWORK TRAFFIC IN A COMPUTER NETWORK

BACKGROUND

Computer networks typically form the backbone of the Information technology (IT) infrastructure of an organization. They have grown in complexity over the last few decades and it has become quite a challenge for the IT personnel to monitor, manage and control network related issues to ensure that system performance and availability of resources is not compromised with the growth in the IT infrastructure. Thus, it is imperative for a network administrator to understand what, where, and how network traffic is flowing. It is only with increased understanding of network traffic behavior that organizations can manage costs, perform capacity planning, ensure high network availability, reduce security risks and troubleshoot problems in advance.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Information technology (IT) infrastructures of organizations have grown in diversity and complexity over the years due to the advancements in technology. This has put a tremendous amount of load on computer networks that are the primary mainstay of these infrastructures. With enormous amounts of data passing through each minute, managing computer networks is not a small matter. It is crucial to understand the flow, volume and type of data travelling through a network to ensure an effective utilization and management of resources, tools, devices, and processes associated with an IT infrastructure. Therefore, network traffic analysis is useful to understand network behavior.

Information related to flow of data in a network could be extracted and exported as datagram packets to a configured collection engine (also known as flow collectors) for further analysis and reporting. Flow collectors analyze flow records received in exported datagrams (exported packets) and present the analysis in form of reports. At times when ongoing network traffic increases, volume of corresponding flow statistics (flow records getting exported) also increases. In such a situation, a flow collector may fail to keep up with the number of flow records it receives and may start dropping flow records. This may lead to incorrect analysis and reporting of network traffic. The issue could be addressed for instance by increasing number of flow collectors. However, this would require additional hardware leading to extra costs for a customer. Another option is to sample flow records at a flow collector.

Typical sampling mechanisms involve multiplying sampled information (for example, bytes or packets) with a sampling rate to arrive at an estimate of traffic flowing in a network. However, such sampling methods do not yield good estimates neither of network traffic nor of traffic trends because neither all IP flows get captured in the sampling nor the values of bytes and/or packets are same across sampled flow records.

Proposed is a method of analyzing network traffic in a computer network from sampled flow records. In an example, proposed solution estimates network traffic trends from sampled flow records at a collection engine (or flow collector).

The term "network traffic" or "traffic" refer to the flow of data in a network.

Figure 1:
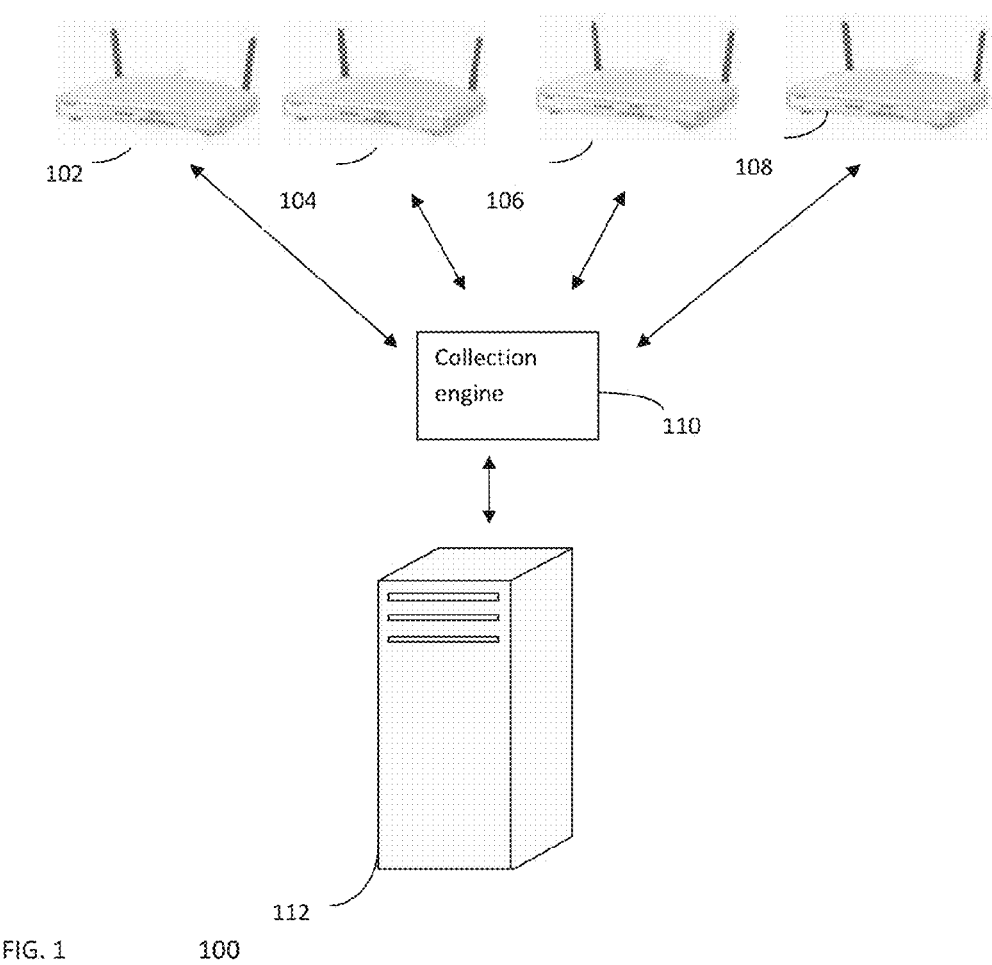
FIG. 1 illustrates a system for analyzing network traffic in a computer network, according to an example.

FIG. 1 illustrates a representative system 100 for analyzing network traffic in a computer network, according to an example. System 100 includes network devices 102, 104, 106, and 108, collection engine(or flow collector) 110, and network server 112. Various components of network system 100 i.e. network devices 102, 104, 106, and 108, collection engine 110, and network server 112 could be operationally connected over a computer network. The computer network may be a wireless or wired network. The computer network may be, for example, a Local Area Network (LAN), a Wireless Local Area Network (WAN), a Metropolitan Area Network (MAN), a Storage Area Network (SAN), or a Campus Area Network (CAN). Further, the computer network may be a public network (such as the Internet) or a private network (for instance, an intranet).

Network devices 102, 104, 106, and 108 may include, for example, a router, a virtual router, a switch, a virtual switch, or any other device with routing or switching functions. Network devices 102, 104, 106, and 108 route data packets through the computer network 114. In an example, network devices 102, 104, 106, and 108 export Internet Protocol (IP) flow information based on a standard. The standard defines how IP flow information is to be formatted and transferred from an exporter network device) to a collector (for instance, a collection engine). Some non-limiting examples of standards that may be used by network devices 102, 104, 106, and 108 to export data packets according to a format may include JFlow, NetFlow, SFlow, and Internet Protocol Flow Information eXport (IPFIX). Network devices 102, 104, 106, and 108 thus may export IP flow records (data packets) according to a pre-defined standard. IP flow records may be defined as a collection of IP packets that share a set of attributes or properties. These attributes determine if a packet is unique or similar to other packets. Typically, a set of 5 to 7 IP packet attributes may be used. These may include for instance source IP address, destination IP address, IP protocol, source port, destination port, etc. An IP flow record may include, for example, details like IP addresses of the source and destination devices or systems, port of the sources and destination devices or systems, number of bytes of data transmitted, and so on.

Collection engine 110 (or flow collector) collects IP flow records from different network devices 102, 104, 106, and 108. There may be one or multiple flow collector in a computer network. In case there are multiple flow collectors, one of the collectors may act as a master collector. The other flow collectors (may be termed as "base collectors") collect IP flow records from various network devices that are configured to export IP flow records and forward the collected data (or a summarized version) to the master collector. Flow collectors processes the data received from network devices 102, 104, 106, and 108, for instance topology information may be added to the collected data. Processed data is shared with network server 112 for generating reports to analyze the network traffic data.

Network server 112 may include a processor for executing machine readable instructions and a memory (storage medium) for storing machine readable instructions. In an implementation, network server 112 may host the collection engine 110 (or flow collector). In an example, network server 112 supports Simple Network Management Protocol (SNMP).

The numbers of network devices 102, 104, 106, and 108, collection engine 110, and network server 112 shown in FIG. 1 is for the purpose of illustration only and these may vary in other implementations.

Figure 2:
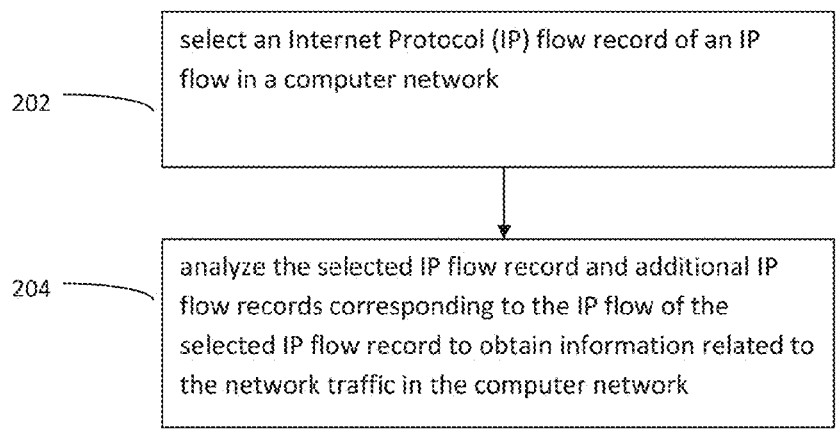
FIG. 2 illustrates a method of analyzing network traffic in a computer network, according to an example.

FIG. 2 illustrates a method of analyzing network traffic in a computer network, according to an example. At block 202, an Internet Protocol (IP) flow record of an IP flow in the computer network is selected. An IP flow is the movement of Internet Protocol-based data packets from a source node to a destination node on a computer network. And, as mentioned earlier, IP flow records may be defined as a collection of IP packets that share a set of attributes or properties such as details like IP addresses of the source and destination devices or systems, port of the sources and destination devices or systems, and so on. In an implementation, IP flow records are collected from a network device by a flow collector in the computer network. The flow collector then selects an IP flow record from the collection. In an example, the IP flow record is randomly selected from the IP flow records received by a flow collector. A user defined pre-configured sampling rate may be used for sampling the received IP flow records. For instance, a random number generator may be used to select a flow record from a sequential block of <N> flow records, where "<N> is the pre-configured sampling rate. In another implementation, an IP flow record may be selected based on a pre-defined criterion. For instance, the criterion could be the byte size of the IP flow record.

Figure 3:
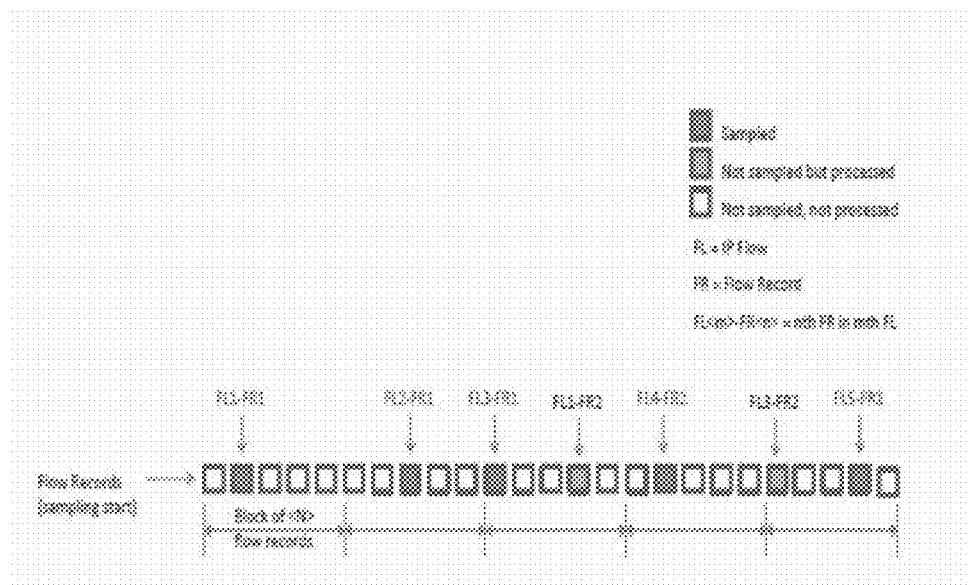
FIG. 3 illustrates a random selection of an IP flow record from a collection of IP flow records, according to an example.

At block 204, the selected IP flow record and additional IP flow records corresponding to the Internet Protocol (IP) flow of the selected IP flow record are analyzed to obtain information related to the network traffic in the computer network. In other words, in addition to the selected flow record, other IP flow records that are part of the same IP flow as the selected flow record are analyzed to obtain network related information. This is illustrated in FIG. 3. FIG. 3 illustrates a random selection of an IP flow record, according to an example. A further selection of IP flow records corresponding to the IP flow of the earlier randomly selected flow record. As shown, one flow record is randomly selected from a block of <N> flow records, where <N> is the configured sampling rate. The selected samples include FL1-FR1, FL2-FR1, FL3-FR1, FL4-FR2, and FL5-FR1 from block 1 to 5 respectively. Subsequently, all those flow records that correspond to IP flow of the randomly selected samples (i.e. FL1-FR1, FL2-FR1, FL3-FR1, FL4-FR2, and FL5-FR1) are selected for analysis. For instance, although flow record FL1-FR2 is not sampled, it still gets selected because it corresponds to same IP flow FL1 as FL1-FR1. Similarly, flow record FL3-FR2 is selected since it corresponds to the same IP flow FL3 as in case of the earlier randomly sampled flow record FL3-FR1. Thus, all flow records corresponding to same IP flow (e.g. both FL1-FR1 and FL1-FR2) which represent same IP flow (i.e. FL1) are analyzed. The other flow records are neither sampled nor processed.

A variety of reports related to network traffic in the computer network can be generated based on the information obtained after analysis of the selected IP flow record and additional IP flow records corresponding to the Internet Protocol (IP) flow of the selected IP flow record. Some non-limiting examples of these reports may include a determination related to volume of traffic between a source and a destination site or node in the network, consumption of network bandwidth by application, consumption of bandwidth by a protocol, and so forth.

Figure 4:
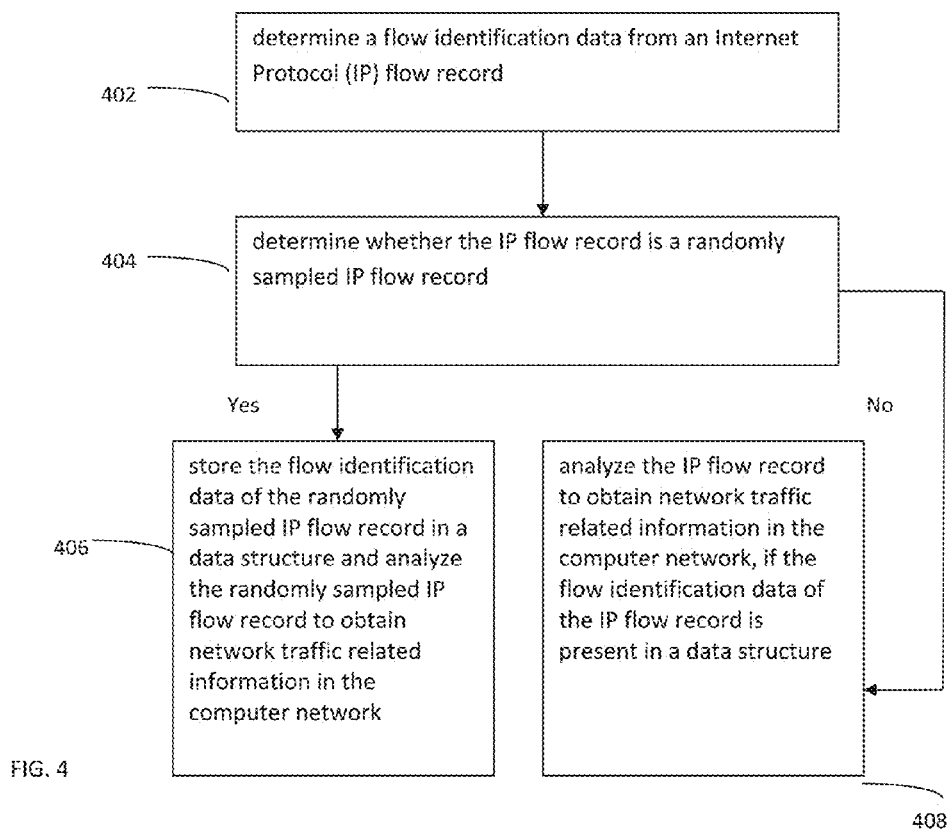
FIG. 4 illustrates a method of analyzing network traffic in a computer network, according to an example.

FIG. 4 illustrates a method of analyzing network traffic in a computer network, according to an example. At block 402, a flow record received in an export packet data from a router is processed by a flow collector to determine its flow identification data (IP flow id). In an example, the flow identification data (IP flow id) is a combination of attributes retrieved from a flow record, which uniquely identifies an IP Flow. These attributes may include source IP, destination IP, source port, destination port, Layer 3 protocol, type of service, and input interface index. At block 404, a determination is made whether the IP flow record is a randomly sampled IP flow record. If the IP flow record is the randomly sampled IP flow record, the flow identification data of the randomly sampled IP flow record is stored in a data structure (block 406), and the IP flow record is processed for obtaining network related information. In an example, the data structure is stored in a cache memory. If the IP flow record is not a randomly sampled IP flow record but the flow identification data of the IP flow record is present in the data structure, additional IP flow records corresponding to the Internet Protocol (IP) flow of the randomly sampled IP flow record are processed for performing network traffic analysis (block 408). In case, a flow record is neither a randomly sampled flow record nor its flow identification data exists in the data structure such flow record is dropped from further processing. The above process is repeated for all flow records received in an export packet and for all newly received export packets.

Figure 5:
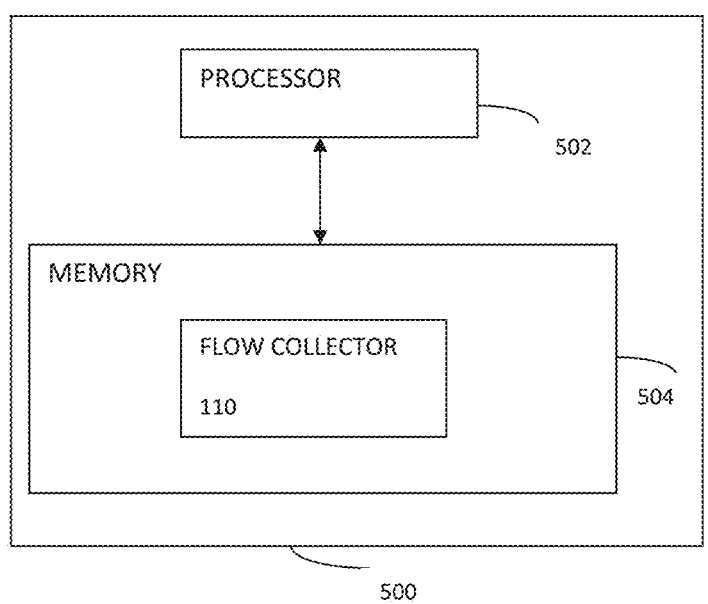
FIG. 5 illustrates a system for analyzing network traffic in a computer network, according to an example.

FIG. 5 illustrates a system for analyzing network traffic in a computer network, according to an example. System 500 includes a processor 502 that executes instructions in a memory 504. The memory 504 includes a flow collector 110 to: determine a flow identification data from an Internet Protocol (IP) flow record, determine whether the IP flow record is a randomly sampled IP flow record, and if the IP flow record is the randomly sampled IP flow record, storing the flow identification data of the randomly sampled IP flow record in a data structure. If the IP flow record is not the randomly sampled IP flow record but the flow identification data of the IP flow record is present in the data structure, analyzing the randomly sampled IP flow record and additional IP flow records corresponding to an IP flow of the randomly sampled IP flow record to obtain network traffic related information in the computer network.

For the purpose of simplicity of explanation, the example methods of FIGS. 2 and 4 are shown as executing serially, however it is to be understood and appreciated that the present and other examples are not limited by the illustrated order. The example systems of FIGS. 1 and 3, and methods of FIGS. 2 and 4 may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and be executed by a processor.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

The invention claimed is:

1. A method of analyzing network traffic in a computer network, comprising:
   selecting an Internet Protocol (IP) flow record of an IP flow in the computer network;
   determining whether the selected IP flow record is a randomly sampled IP flow record;
   responsive to determining that the selected IP flow record is the randomly sampled IP flow record, storing the flow identification data of the randomly sampled IP flow record in a data structure; and
   responsive to determining that the selected IP flow record is not the randomly sampled IP flow record but the flow identification data of the selected IP flow record is present in the data structure, analyzing the randomly sampled IP flow record and additional IP flow records corresponding to an IP flow of the randomly sampled IP flow record to obtain network traffic related information in the computer network; and
   analyzing the selected IP flow record and additional IP flow records corresponding to the IP flow of the selected IP flow record to obtain information related to the network traffic in the computer network.

2. The method of claim 1, wherein the Internet Protocol (IP) flow record is randomly selected from IP flow records received by a flow collector.

3. The method of claim 1, wherein the Internet Protocol (IP) flow record is selected based on a predefined criterion.

4. The method of claim 3, wherein the criterion comprises a byte size of the IP flow record.

5. The method of claim 1, further comprising generating a network traffic flow report based on the information obtained related to the network traffic in the computer network.

6. The method of claim 1, further comprising displaying the information obtained related to the network traffic in the computer network.

7. The method of claim 1, wherein the IP flow records are generated by a network device.

8. A system for analyzing network traffic in a computer network, comprising:
   a physical processor implementing machine readable instructions to:
      determine a flow identification data from an Internet Protocol (IP) flow record;
      determine whether the IP flow record is a randomly sampled IP flow record;
      responsive to determining that the IP flow record is the randomly sampled IP flow record, store the flow identification data of the randomly sampled IP flow record in a data structure; and
      responsive to determining that the IP flow record is not the randomly sampled IP flow record but the flow identification data of the IP flow record is present in the data structure, analyze the randomly sampled IP flow record and additional IP flow records corresponding to an IP flow of the randomly sampled IP flow record to obtain network traffic related information in the computer network.

9. The system of claim 8, further comprises: a network server that hosts the physical processor.

10. The system of claim 8, wherein the system generates a report based on the obtained network traffic related information in the computer network.

11. The system of claim 8, wherein the physical processor implements machine readable instructions that cause the system to: directly or indirectly collect the IP flow records from a network device.

12. The system of claim 11, wherein the network device comprises a router or a network switch.

13. The system of claim 8, wherein the data structure is included in a cache memory.

14. The system of claim 8, wherein the IP flow record is received via an export data packet from a network device.

15. A non-transitory processor readable medium, the non-transitory processor readable medium comprising machine executable instructions, the machine executable instructions when executed by a processor causes the processor to:
   randomly sample an Internet Protocol (IP) flow record from IP flow records collected from a network device;
   determine a flow identification data from an Internet Protocol (IP) flow record;
   responsive to determining that the IP flow record is the randomly sampled IP flow record, store the flow identification data of the randomly sampled IP flow record in a data structure; and
   responsive to determining that the IP flow record is not the randomly sampled IP flow record but the flow identification data of the IP flow record is present in the data structure, analyze the randomly sampled IP flow record and other IP flow records corresponding to an Internet Protocol (IP) flow of the randomly sampled IP flow record to determine network traffic related information in a computer network.

16. The medium of claim 15, further comprising instructions that cause the process to:
   generate a report based on the obtained network traffic related information in the computer network.

17. The medium of claim 15, further comprising instructions that cause the process to:
   directly or indirectly collects the IP flow records from the network device.

18. The medium of claim 17, wherein the randomly sampled IP flow record is received via an export data packet from a network device.

19. The medium of claim 15, further comprising instructions that cause the processor to:
   select a second Internet Protocol (IP) flow record of a second IP flow in the computer network; and
   analyze the selected second IP flow record and additional IP flow records corresponding to the second IP flow of the selected second IP flow record to obtain information related to the network traffic.

20. The medium of claim 15, wherein the Internet Protocol (IP) flow record is selected based on a predefined criterion, and wherein criterion is a byte size of the IP flow record. method of claim 3, wherein the criterion is a byte size of the IP flow record.

* * * * *